United States Patent
Ito et al.

(10) Patent No.: US 12,323,697 B2
(45) Date of Patent: Jun. 3, 2025

(54) IMAGING DEVICE AND IMAGING METHOD

(71) Applicant: SONY GROUP CORPORATION, Tokyo (JP)

(72) Inventors: Masanobu Ito, Tokyo (JP); Jun Aoyama, Tokyo (JP); Hiroki Watanabe, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 276 days.

(21) Appl. No.: 17/906,646

(22) PCT Filed: Feb. 15, 2021

(86) PCT No.: PCT/JP2021/005520
§ 371 (c)(1),
(2) Date: Sep. 19, 2022

(87) PCT Pub. No.: WO2021/192724
PCT Pub. Date: Sep. 30, 2021

(65) Prior Publication Data
US 2023/0133045 A1     May 4, 2023

(30) Foreign Application Priority Data

Mar. 25, 2020 (JP) ................................. 2020-053687

(51) Int. Cl.
*H04N 23/63* (2023.01)
*G03B 17/14* (2021.01)
(Continued)

(52) U.S. Cl.
CPC ........... *H04N 23/633* (2023.01); *G03B 17/14* (2013.01); *H04N 23/631* (2023.01); *H04N 23/651* (2023.01); *H04N 23/667* (2023.01)

(58) Field of Classification Search
CPC .... H04N 23/631; H04N 23/633; H04N 23/65; H04N 23/651; H04N 23/667; G03B 17/14
See application file for complete search history.

(56) References Cited

U.S. PATENT DOCUMENTS

| 2002/0008765 A1* | 1/2002 | Ejima .................. H04N 23/635 348/E5.047 |
| 2007/0166026 A1 | 7/2007 | Matsuzawa et al. |
| 2014/0293108 A1* | 10/2014 | Shibuno ............... H04N 23/633 348/333.01 |

FOREIGN PATENT DOCUMENTS

| CN | 101005571 A | 7/2007 |
| CN | 102314045 A | 1/2012 |

(Continued)

OTHER PUBLICATIONS

International Search Report and Written Opinion of PCT Application No. PCT/JP2021/005520, issued on May 11, 2021, 09 pages of ISRWO.

*Primary Examiner* — Daniel M Pasiewicz
(74) *Attorney, Agent, or Firm* — CHIP LAW GROUP

(57) ABSTRACT

The present invention relates to an imaging device including a camera body configured to attach, to a barrel body, a lens barrel including a collapsible barrel in which a barrel holding at least one lens can be in a stored state and in an extended state by manual operation, and a control unit configured to perform control to execute a display of information indicating a state of the imaging device in a case where the lens barrel attached to the camera body is detected to be in the stored state.

13 Claims, 7 Drawing Sheets

(51) Int. Cl.
*H04N 23/65* (2023.01)
*H04N 23/667* (2023.01)

(56) References Cited

FOREIGN PATENT DOCUMENTS

| | | |
|---|---|---|
| JP | 06-186629 A | 7/1994 |
| JP | 2007-096646 A | 4/2007 |
| JP | 2007-194769 A | 8/2007 |
| JP | 2010103599 A | 5/2010 |
| JP | 2014-077878 A | 5/2014 |
| JP | 2015079042 A | 4/2015 |
| JP | 2018-045246 A | 3/2018 |

\* cited by examiner

IMAGING DEVICE AND IMAGING METHOD

CROSS REFERENCE TO RELATED APPLICATIONS

This application is a U.S. National Phase of International Patent Application No. PCT/JP2021/005520 filed on Feb. 15, 2021, which claims priority benefit of Japanese Patent Application No. JP 2020-053687 filed in the Japan Patent Office on Mar. 25, 2020. Each of the above-referenced applications is hereby incorporated herein by reference in its entirety.

TECHNICAL FIELD

The present technology relates to an imaging device and an imaging method, and particularly relates to processing of an imaging device to which a collapsible-type lens barrel can be attached.

BACKGROUND ART

Some imaging devices are of a collapsible-type in which an interchangeable lens provided as a lens barrel can be attached to and detached from a device body and the interchangeable lens is extended and retracted.

In particular, in a camera with an interchangeable lens, it is desirable to reduce the size of a lens barrel in order to make it convenient to mount and carry the lens. It is therefore preferable to use a collapsible lens barrel which can be collapsed, when no image is captured, so that the length of the lens barrel can be shortened.

A collapsible lens barrel (interchangeable lens) is described in Patent Document 1 below.

CITATION LIST

Patent Document

Patent Document 1: Japanese Patent Application Laid-Open No.

SUMMARY OF THE INVENTION

Problems to be Solved by the Invention

Incidentally, in the case of a lens barrel that is manually collapsed, stored, and extended, an imaging device body is not suitable for imaging in the collapsed and stored state even in an imaging mode. This is because the following often occurs in the stored state: focus is not achieved; resolution of an image captured is low; and optical characteristics inherent in the lens cannot be met due to optical aberration or the like.

On the other hand, in a case where the collapsible lens is extended, imaging is ready.

In a case where such a collapsible lens barrel is used, it is desired to provide useful information and operation for a photographer/videographer in a situation where the collapsible lens is in the stored state.

Therefore, an object of the present disclosure is to improve the usability by performing processing corresponding to the situation where the collapsible lens is in the stored state.

Solutions to Problems

An imaging device according to the present technology includes a camera body configured to attach, to a barrel body, a lens barrel including a collapsible barrel in which a barrel holding at least one lens can be in a stored state and in an extended state by manual operation, and a control unit configured to perform control to execute a display of information indicating a state of the imaging device in a case where the lens barrel attached to the camera body is detected to be in the stored state.

That is, in a case where the collapsible lens barrel is attached, processing is performed according to whether the lens barrel is in the stored state or the extended state. The processing is display control of information indicating the state of the imaging device performed when the lens barrel is in the stored state.

In the imaging device according to the present technology described above, it is conceivable that the control unit performs control to display setting information as the information indicating a state of the imaging device.

The setting information is information such as various mode states and parameters related to an imaging operation and a function.

In the imaging device according to the present technology described above, it is conceivable that the control unit performs control to finish the display of the setting information in response to that the extended state is detected while the setting information is displayed in response to the detection of the stored state.

That is, displaying the setting information is finished when a user extends the lens barrel.

In the imaging device according to the present technology described above, it is conceivable that the control unit performs control to display the setting information and not to display a through-image of a captured image in response to the detection of the stored state, and performs control to finish the display of the setting information and to display the through-image of the captured image in response to detection of the extended state.

The through-image is not displayed while the setting information is displayed. The display of the setting information is finished when the user extends the lens barrel, and the display is switched to a through-image which is a monitoring image of the captured image.

In the imaging device according to the present technology described above, it is conceivable that the control unit performs setting change processing in response to detection of a predetermined operation in a case where the setting information is displayed.

For example, various types of setting information including setting items for imaging preparation are displayed in a list, which allows the user to select a setting item. Then, the setting change processing is performed in accordance with operation for selecting an item, operation for setting content, or the like.

In the imaging device according to the present technology described above, it is conceivable that the control unit displays, in response to detection of a designation operation on the display of the setting information, a change screen in a menu hierarchy of setting information designated, and performs setting change processing in response to detection of an operation on the change screen.

For example, transition is made from a setting list including the setting items for imaging preparation to a change screen for the designated setting item among items prepared in the hierarchical structure of a menu screen.

In the imaging device according to the present technology described above, it is conceivable that the control unit performs control to finish the display of the change screen and to display the through-image of the captured image in response to detection of the extended state while the change screen is displayed in the stored state.

For example, even in a state where transition is made to the change screen in the menu hierarchy in the stored state, in a case where the user extends the lens barrel, the change screen is finished to switch to a through-image.

In the imaging device according to the present technology described above, it is conceivable that the control unit performs control to display, as the information indicating a state of the imaging device, information regarding a cooperative function in which moving image recording is controlled in response to the stored state and the extended state of the lens barrel.

For example, in a case where a cooperative function is provided such that moving image recording is started in response to the collapsible lens extended, display regarding the function is performed.

In the imaging device according to the present technology described above, it is conceivable that the control unit performs control to start the moving image recording in response to the extended state of the lens barrel in a case where the cooperative function is enabled.

In short, moving image recording is started in response to the user extending the collapsible lens.

In the imaging device according to the present technology described above, it is conceivable that the control unit performs control to stop the moving image recording in response to the stored state of the lens barrel in a case where the moving image recording is started with the cooperative function.

In short, moving image recording is stopped in response to the user storing the collapsible lens.

In the imaging device according to the present technology described above, it is conceivable that the control unit performs control to execute a display in which an operation of on/off of the cooperative function is enabled together with the information regarding the cooperative function.

For example, in a case where the cooperative function is provided such that moving image recording is started in response to the collapsible lens extended, the user can select on/off of the function.

In the imaging device according to the present technology described above, it is conceivable that the control unit performs control to finish the display of the information indicating a state of the imaging device and to turn off a power in response to that the stored state continues for a first predetermined period of time or more in standby due to non-operation.

The standby due to non-operation means a state in which there is no user operation and no imaging recording operation or no moving image reproduction operation is performed. In the stored state, information indicating the state of the imaging device is displayed; however, the display is finished after a lapse of a certain period of time while the imaging device is on standby due to non-operation, and the power is turned off.

In the imaging device according to the present technology described above, it is conceivable that the control unit performs control to turn off the power in response to that the standby due to non-operation continues for a second predetermined period of time or more in the extended state, and the first predetermined period of time is shorter than the second predetermined period of time.

In both the extended state and the stored state, the power is turned off after the lapse of time in the standby state due to non-operation; however, the power is turned off earlier in the stored state.

An imaging method according to the present technology is an imaging method including performing, by an imaging device including a camera body configured to attach, to a barrel body, a lens barrel including a collapsible barrel in which a barrel holding at least one lens can be in a stored state and in an extended state by manual operation, control to execute a display of information indicating a state of the imaging device in a case where the lens barrel attached to the camera body is detected to be in the stored state.

With this arrangement, appropriate information presentation is performed in the stored state.

MODE FOR CARRYING OUT THE INVENTION

Hereinafter, embodiments are described in the following order.

<1. Configuration of lens barrel and camera body>
<2. Processing of first embodiment>
<3. Processing of second embodiment>
<4. Processing of third embodiment>
<5. Processing of fourth embodiment>
<6. Summary and modification example>

1. Configuration of Lens Barrel and Camera Body

Figure 1:
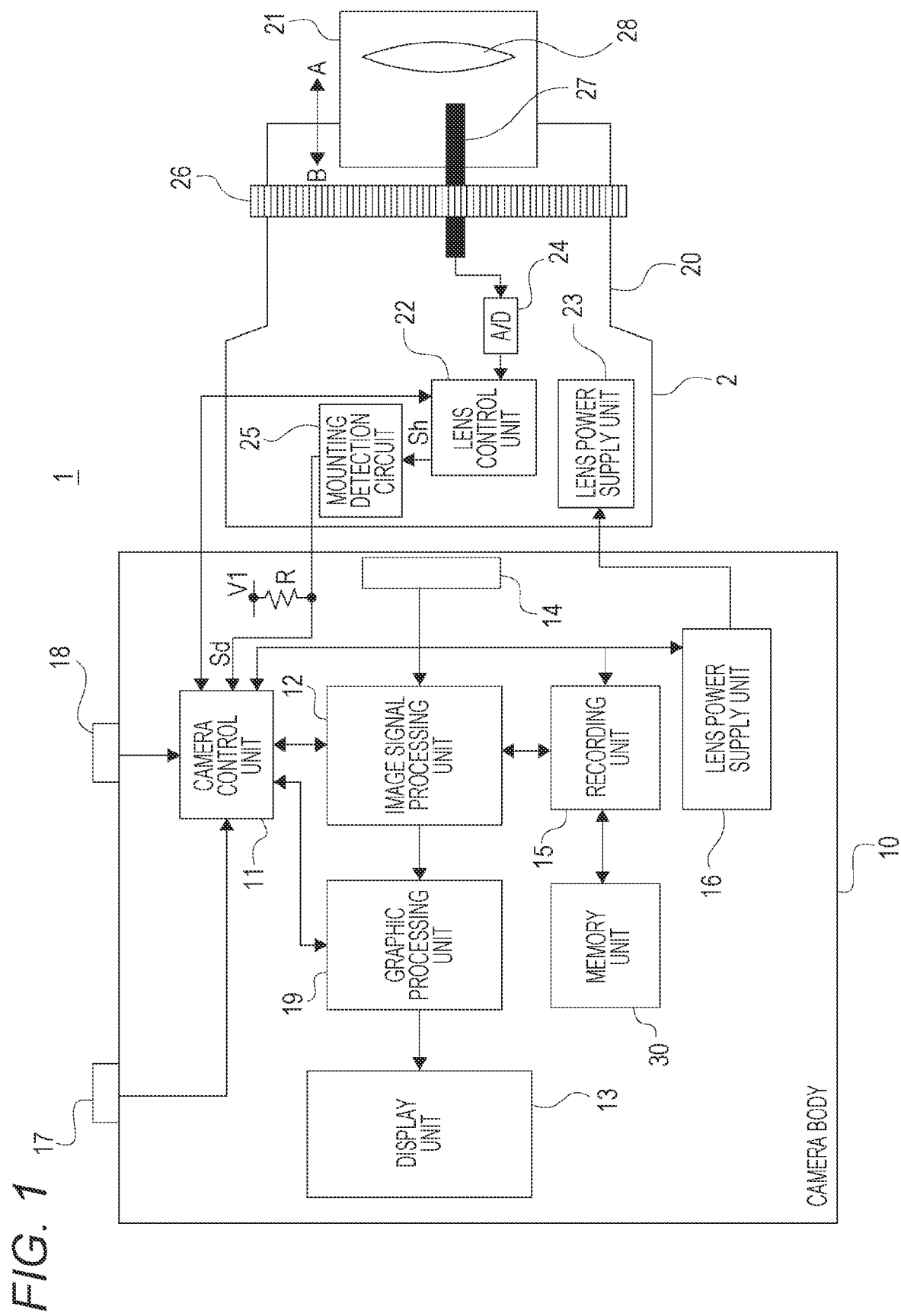
FIG. 1 is a block diagram of a lens barrel and a camera body of an imaging device according to an embodiment of the present technology.

FIG. 1 illustrates a configuration of main parts of a camera body 10 (imaging device body) and a lens barrel 2 as an imaging device 1 of an embodiment.

The camera body 10 is a so-called interchangeable lens type digital camera body, and the lens barrel 2 is an interchangeable lens that can be attached to the camera body 10.

The camera body 10 includes a camera control unit 11, an image signal processing unit 12, a display unit 13, an image sensor 14, a recording unit 15, a lens power supply unit 16, a power supply operator 17, a recording operator 18, a graphic processing unit 19, and a memory unit 30.

The image sensor 14 is, for example, an imaging element such as a charge coupled device (CCD) sensor, a complementary metal oxide semiconductor (CMOS) sensor, or the like, and the image sensor 14 receives light, from an object, entering through an imaging optical system mounted on the lens barrel 2, converts the light into an electrical signal, and outputs the electrical signal. The image sensor 14 performs, for example, correlated double sampling (CDS) processing, automatic gain control (AGC) processing, and the like, and further performs analog/digital (A/D) conversion processing on the electrical signal obtained by photoelectric conversion of the received light. Then, image data as digital data is outputted to the image signal processing unit 12.

The image signal processing unit 12 is configured as an image processing processor by, for example, a digital signal processor (DSP) or the like. The image signal processing unit 12 performs various types of processing on the image data inputted from the image sensor 14.

For example, in a case where an image signal is assumed as a normal visible light image, the image signal processing unit 12 performs clamp processing of clamping black levels of red (R), green (G), and blue (B) to a predetermined level, correction processing between color channels of R, G, and B, demosaicing for ensuring that image data for each pixel has all color components of R, G, and B, processing of generating (separating) a luminance (Y) signal and a color (C) signal, and so on.

Further, the image signal processing unit 12 performs necessary resolution conversion processing, for example, resolution conversion for recording, communication output, or monitor image (through-image), on the image signal that has been subjected to various types of signal processing.

Further, the image signal processing unit 12 sometimes performs, for example, compression processing for recording or communication, encoding processing, and the like on the resolution-converted image data.

The camera control unit 11 is implemented by a microcomputer (arithmetic processing unit) including a central processing unit (CPU), a read only memory (ROM), a random access memory (RAM), a flash memory, and the like.

The CPU executes a program stored in the ROM, the flash memory, or the like to control the entire interchangeable lens camera in an integrated manner.

The RAM is used for temporary storage of data, programs, and the like as a work area for various data processing of the CPU.

The ROM and the flash memory (nonvolatile memory) are used for storing an operating system (OS) for the CPU to control each unit, and storing content files such as image files, application programs for various operations, firmware, and the like.

Such a camera control unit 11 performs control related to imaging operation such as a shutter speed, exposure adjustment, a frame rate, and the like in the image sensor 14, and performs parameter control of various signal processing in the image signal processing unit 12. Further, the camera control unit 11 performs setting processing and imaging operation control in response to user operations. Further, the camera control unit 11 gives a command to the graphic processing unit 19 to perform display operation control.

The camera control unit 11 also performs communication with a lens control unit in the lens barrel 2 to acquire information regarding the lens barrel 2 side and transmit a control signal to the lens barrel 2.

For example, the camera control unit 11 transmits, to a lens control unit 22, a control signal related to an autofocus operation and an exposure operation of a diaphragm mechanism, and acquires, from the lens control unit 22, position information of a zoom lens and a focus lens and information such as an aperture state of the diaphragm mechanism.

The power supply operator 17 indicates a user operator for power supply operation on the camera body 10. The user operates the power supply operator 17 to turn on/off the camera body 10.

The recording operator 18 indicates an operator for recording a still image or a moving image by the user. For example, a shutter button for still image recording, a REC button for starting/stopping moving image recording, and the like are illustrated as the operators.

The camera control unit 11 detects operation information of the power supply operator 17 and the recording operator 18. The camera control unit 11 performs necessary control processing in response to operation information detected.

Note that other operators operable by the user are provided in many cases, but illustrations and explanations thereof are omitted. For example, various types of switches, levers, touch panels, remote controllers, and so on are prepared.

The display unit 13 is a display unit that provides various displays to the user (person who captures an image or the like), and includes, for example, a display device such as a liquid crystal display (LCD) or an organic electro-luminescence (EL) display, and a display driver that causes the display device to perform display. The display unit 13 performs display of a through-image, a reproduced image of a recorded still image or moving image, various setting screens, and so on by processing of the graphic processing unit 19 according to the control of the camera control unit 11. Further, the display unit 13 also displays a character, an icon, a menu, a message, and so on generated by the graphic processing unit 19.

A touch panel as the operator described above may be disposed on the display unit 13. For example, the graphic processing unit 19 can cause the display unit 13 to display an operation icon and a menu item, allowing the user to perform an operation on the display by a touch operation.

Further, in the display unit 13, various operation icons, menu items, and so on may be configured in such a way that a cursor is moved by operating a required operator.

The recording unit 15 performs processing of recording, for example, image data such as still image data and moving image data, attribute information of an image file, a thumbnail image, and the like in the memory unit 30 including a recording medium such as a nonvolatile memory under the control of the camera control unit 11.

The recording unit 15 adds, for example, metadata such as Exif data and the like to image data to be recorded to form a file, and records the file in the recording medium of the memory unit 30.

The actual configuration of the recording unit 15 and the memory unit 30 can be considered in various ways. For example, the memory unit 30 may be a flash memory built in the camera body 10, and the recording unit 15 may be a write/read circuit for the flash memory. Alternatively, the memory unit 30 may be a memory card (for example, a portable flash memory) attachable to and detachable from the camera body 10, and the recording unit 15 may be a card recording/reproducing unit that performs recording/reproducing access to the memory card. Further, as a form built in the camera body 10, the recording unit 15 and the memory unit 30 may be implemented as a hard disk drive (HDD) or the like.

The lens power supply unit 16 is a part of a power supply circuit (not illustrated) of the camera body 10, and is illustrated as a portion that supplies a power supply voltage to the attached lens barrel 2. The lens power supply unit 16 supplies the power supply voltage to the lens barrel 2 under the control of the camera control unit 11.

As the configuration of the lens barrel 2, a barrel body 20, a collapsible barrel 21, a lens control unit 22, a lens power supply unit 23, an A/D converter 24, a mounting detection circuit 25, a zoom operation ring 26, a zoom/collapsed position sensor 27, and a lens 28 are illustrated.

Although the detailed description of the collapsing mechanism in the barrel body 20 and the collapsible barrel 21 is avoided, in the lens barrel 2 of the present embodiment, the collapsible barrel 21 can be displaced between a state of being collapsed and stored in the barrel body 20 and a state of being extended from the barrel body 20. That is, a structure as a so-called collapsible barrel is adopted.

In the collapsible barrel 21, a lens optical system including one or a plurality of lenses schematically illustrated as the lens 28, an optical filter, a diaphragm mechanism, and the like, a mechanism for changing the lens position of the zoom lens or the focus lens in the optical axis direction, and the like are mounted.

In a stored state in which the collapsible barrel 21 is collapsed so as to be retracted into the barrel body 20 in the direction of arrow B, the entire length of the lens barrel 2 in the optical axis direction is shortened, which is convenient to carry and store the lens barrel 2.

In a case where the lens barrel 2 is attached to the camera body 10 for use, the collapsible barrel 21 is made in an extended state in which the collapsible barrel 21 is extended from the barrel body 20 forward in the optical axis direction (direction of arrow A).

In the present disclosure, the state in which the collapsible barrel 21 is retracted into the barrel body 20 as described above is referred to as a "stored state", and the state in which the collapsible barrel 21 is extended forward is referred to as an "extended state". Here, the stored state is not limited to a state in which the entire collapsible barrel 21 is retracted into the barrel body 20 and hidden, but also includes a state in which the collapsible barrel 21 is retracted inside the barrel body 20 beyond the position for imaging and only a part of the collapsible barrel is hidden.

In the present embodiment, it is assumed that the stored state and the extended state of the collapsible barrel 21 are manually operated by the user.

In other words, a mechanism such as an extending/storing motor is not mounted, and for example, the user turns the zoom operation ring 26 to allow the collapsible barrel 21 to be extended from the stored state. After the collapsible barrel 21 is in the extended state, the user further turns the zoom operation ring 26 in the same direction so as to change the position of the zoom lens to a position on a telephoto side. Further, in a case where the user turns the zoom operation ring 26 in the opposite direction, the zoom lens moves from the telephoto side to a wide-angle side, and in a case where the user further turns the zoom operation ring 26 in the same direction from the widest-angle position, the collapsible barrel 21 is collapsed in the barrel body 20 so as to change to the stored state.

The structure of the lens barrel 2 can be simplified and the cost can be reduced by not installing the extending/storing motor mechanism.

In addition, since the zoom operation ring 26 also serves as an operator for extending/storing, it is not necessary to provide a separate operation mechanism. Further, the user can perform a series of operations using the zoom operation ring 26 from extending the collapsible barrel 21 to the zoom setting, which provides good usability.

The lens control unit 22 is implemented by a microcomputer (arithmetic processing device) including a CPU, a ROM, a RAM, a flash memory, and the like.

The CPU executes a program stored in the ROM, the flash memory, or the like to perform operation control necessary for the lens barrel 2 and communication processing.

The RAM is used for temporary storage of data, programs, and the like as a work area for various data processing of the CPU.

The ROM and the flash memory (nonvolatile memory) are used for storing an operating system (OS) for the CPU to control each unit, and storing application programs for various operations, firmware, and the like. Further, information regarding the lens barrel 2 itself, such as a model number and a manufacturer, is also stored in the ROM or the flash memory.

In response to a command given by the camera control unit 11, the lens control unit 22 controls a focus lens drive mechanism and a diaphragm mechanism (not illustrated) to perform an autofocus operation and an exposure adjustment operation.

Further, the lens control unit 22 can transmit information such as a model number, information regarding a lens state, for example, information regarding whether the lens is in the stored state or the extended state, and the like state via communication with the camera control unit 11.

The zoom/collapsed position sensor 27 is a sensor that detects a zoom and a collapsed position as a potentiometer.

A detection signal of the zoom/collapsed position sensor 27 is converted into digital data by the A/D converter 24 and the resultant is supplied to the lens control unit 22. As a result, the lens control unit 22 can detect whether the collapsible barrel 21 is currently in the stored state or the extended state. In addition, the zoom lens position can be detected in the extended state.

The mounting detection circuit 25 is a circuit provided to cause the camera control unit 11 to detect whether or not the lens barrel 2 is attached.

The camera control unit 11 receives an input of a mounting detection signal Sd. The mounting detection signal Sd is pulled up to a voltage V1 (for example, 3 V) via a resistor R in the camera body 10. Therefore, in a case where the lens barrel 2 is not attached, the mounting detection signal Sd detected by the camera control unit 11 is at a high (H) level. In a case where the mounting detection signal Sd is at the H level, the camera control unit 11 determines that the lens barrel 2 is not attached.

In response to the lens barrel 2 attached, the mounting detection circuit 25 is connected to a signal path of the mounting detection signal Sd. Since the mounting detection circuit 25 is a circuit that connects the signal path to the ground for example, the mounting detection signal Sd is at a low (L) level. Therefore, in a case where the mounting detection signal Sd is at the L level, the camera control unit 11 determines that the lens barrel 2 is attached.

Note that the mounting detection circuit 25 has a circuit configuration in which the signal path of the mounting detection signal Sd and the ground are connected independent of whether the lens barrel 2 is powered on or off.

The lens power supply unit 23 is, for example, a DC/DC converter, generates a necessary operating voltage in the lens barrel 2 from the power supply voltage supplied from the lens power supply unit 16, and supplies the power supply voltage to the lens control unit 22, the A/D converter 24, the zoom/collapsed position sensor 27, the mounting detection circuit 25, and a focus drive mechanism, a diaphragm drive mechanism, and the like (not illustrated).

2. Processing of First Embodiment

Processing of the first embodiment by the camera body 10 and the lens barrel 2 having the configuration described above is described.

In the lens barrel 2 according to the present embodiment, as described above, the collapsible barrel 21 can be in the stored state or the extended state, and the user manually performs the state changing operation with the zoom operation ring 26.

In the stored state, an image captured by the image sensor 14 is out of focus or has reduced resolution, so that an appropriate image cannot be captured. Accordingly, the user needs to perform an extending operation at the time of use.

Figure 2:
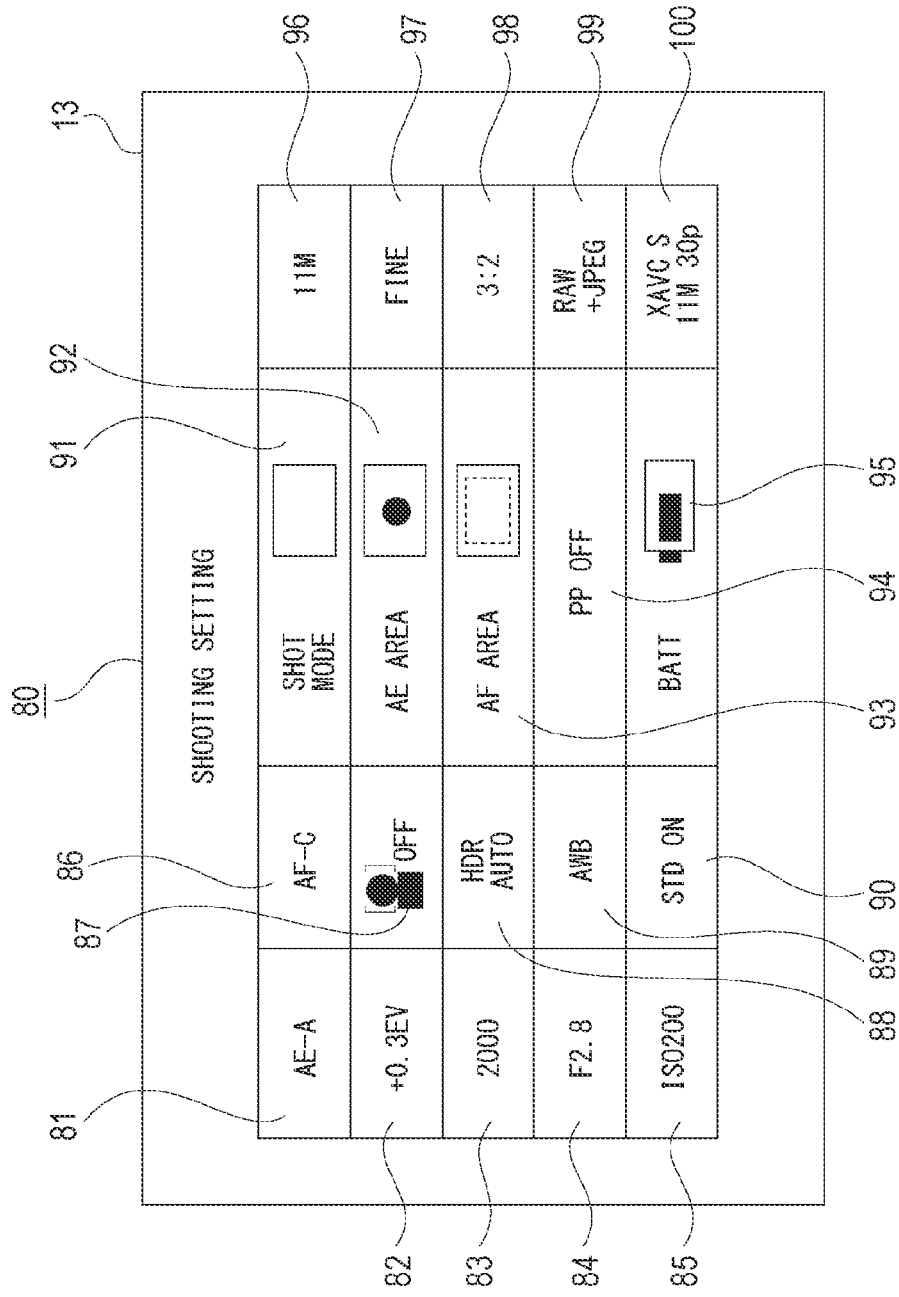
FIG. 2 is an explanatory diagram of an example of display contents of a setting list according to an embodiment.

In the first embodiment, the camera control unit 11 detects whether the collapsible barrel 21 is in the stored state or the extended state, and, in a case where the collapsible barrel 21 is in the stored state, the camera control unit 11 performs processing of displaying a setting list 80 as illustrated in FIG. 2 on the display unit 13.

The setting list 80 is an example of a display of various types of setting information of the imaging device 1, and in particular, is a collection of modes, parameters, and the like as a plurality of pieces of setting information that is desirable for the user to check in preparation for imaging.

As illustrated in the drawing, content of the setting information includes respective displays as an aperture priority mode 81, an exposure correction mode 82, a shutter speed 83, an F value 84, an ISO sensitivity 85, an autofocus mode 86, a face detection mode 87, a high dynamic range mode 88, an auto white balance 89, a camera shake correction mode 90, a single/continuous shooting mode 91, an AE area 92, an AF area 93, a picture profile setting 94, a remaining battery level 95, a still image recording size 96, an image quality mode 97, an aspect ratio 98, a recorded image type 99, and a moving image recording format 100. Needless to say, they are just examples.

Figure 3:
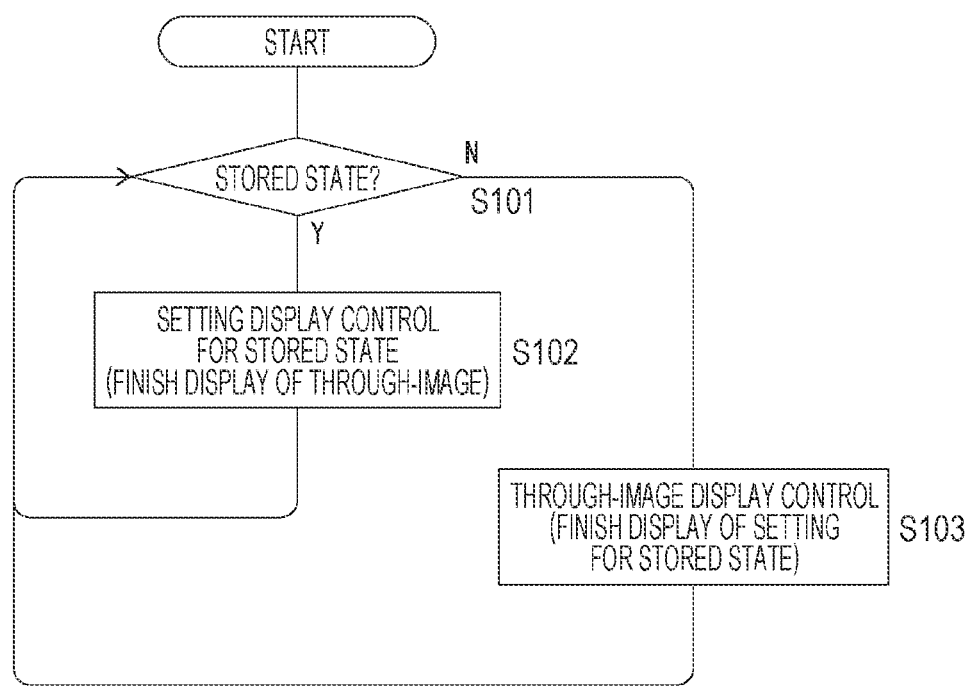
FIG. 3 is a flowchart of processing of a camera control unit according to a first embodiment.

FIG. 3 illustrates an example of processing of the camera control unit 11 for displaying such a setting list 80.

In step S101, the camera control unit 11 checks whether the lens barrel 2 side is currently in the stored state or the extended state.

As described above, an analog signal by the zoom/collapsed position sensor 27 is converted into a digital signal by the A/D converter 24, and the lens control unit 22 detects either the stored state or the extended state. Then, the lens control unit 22 periodically transmits information regarding stored state/extended state to the camera control unit 11 via lens-body communication. In step S101, the camera control unit 11 checks the information sent by the lens control unit 22.

If the lens barrel 2 side is in the stored state, then the processing of the camera control unit 11 proceeds to step S102 in which setting display control for the stored state is performed on the graphic processing unit 19. That is, the graphic processing unit 19 is instructed to display the setting list 80 as illustrated in FIG. 2, for example. This allows the display unit 13 to display the setting list 80. Note that, in a case where the detection content is at the timing of switching from the previous extended state to the stored state, an instruction is also given to finish the display of the through-image displayed until that time.

On the other hand, in a case where the extended state is detected in step S101, the processing of the camera control unit 11 proceeds from step S101 to step S103 in which control on a through-image display is performed. Note that, in a case where the detection content is at the timing of switching from the previous stored state to the extended state, an instruction is also given to finish the display of the setting list 80 displayed until that time.

The processing described above is performed and, if the lens barrel 2 side is in the stored state, then the setting list 80 as illustrated in FIG. 2 is displayed, and if the lens barrel 2 side is in the extended state, then a through-image is displayed.

As described above, the stored state is not suitable for imaging; however, in that case, the user can check the setting state with the setting list 80. When capturing an image, the user turns the zoom operation ring 26 to switch to the extended state. In such a case, displaying the setting list 80 is finished and the through-image is displayed, so that the display unit 13 is in a state suitable for monitoring the object at the time of imaging.

3. Processing of Second Embodiment

Figure 4:
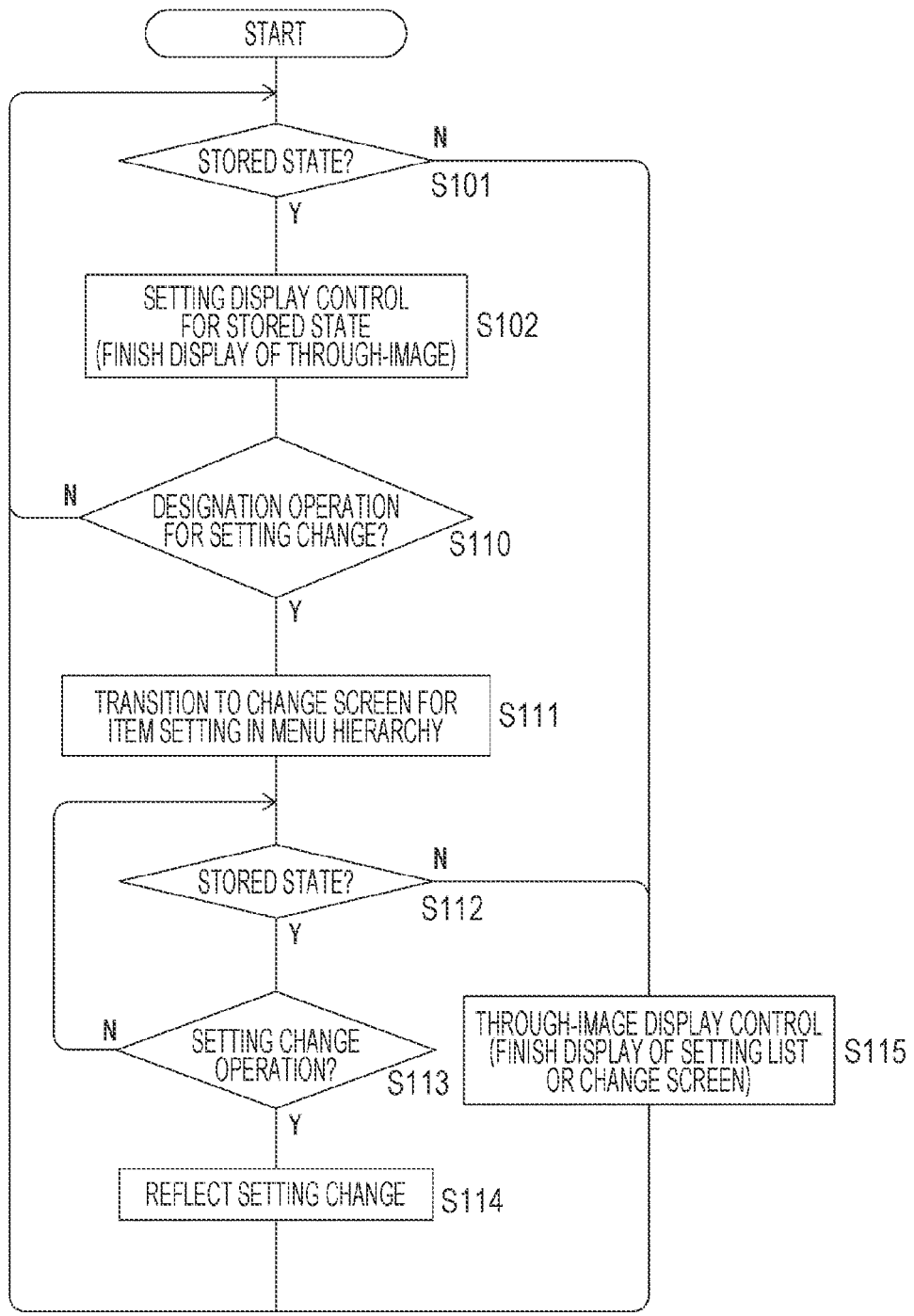
FIG. 4 is a flowchart of processing of a camera control unit according to a second embodiment.
Figure 5:
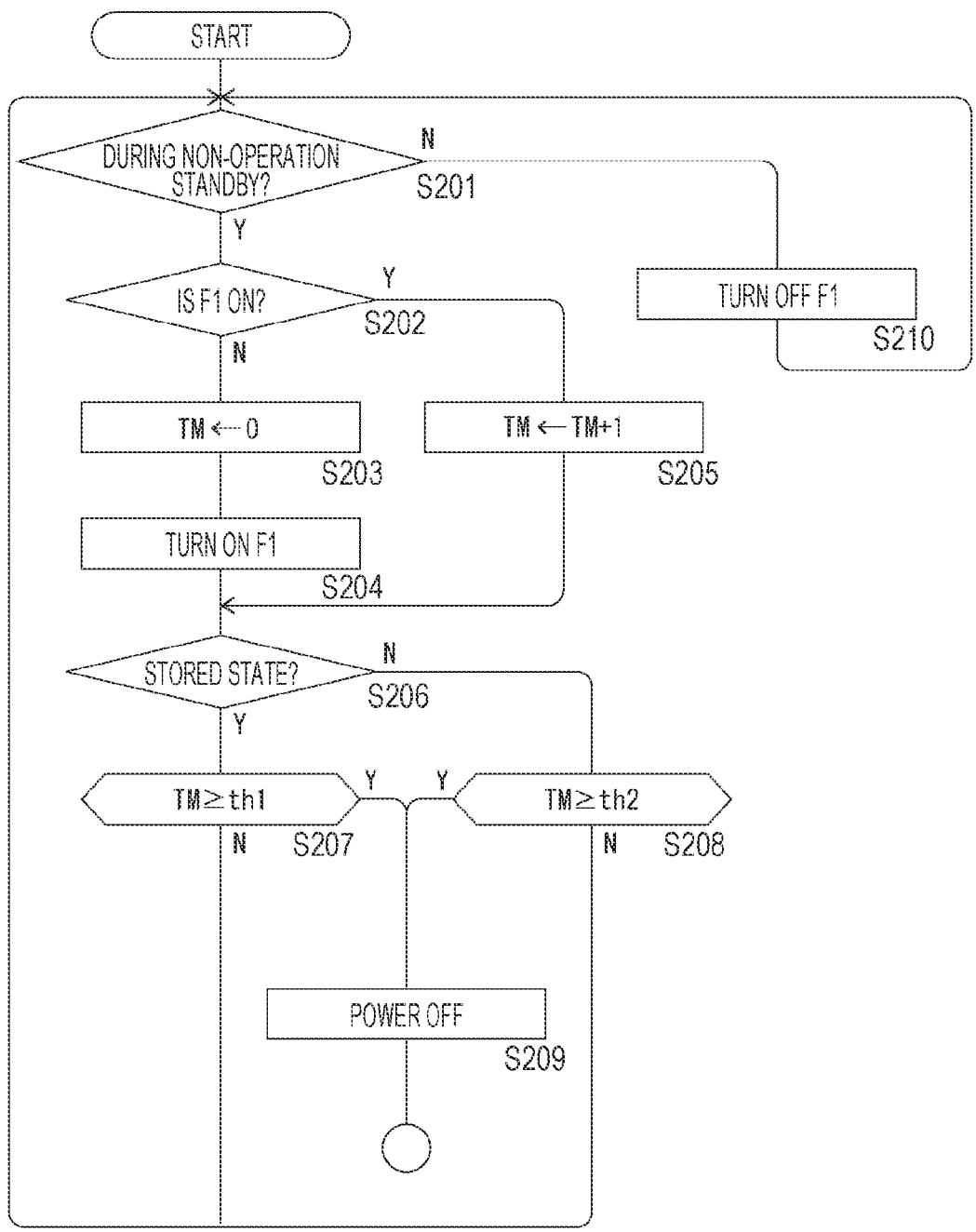
FIG. 5 is a flowchart of processing of a camera control unit according to a third embodiment.

As a processing example of the second embodiment, an example is described in which a menu operation from the display of the setting list 80 is enabled. FIG. 4 illustrates a processing example of the camera control unit 11.

In step S101, the camera control unit 11 checks whether the lens barrel 2 side is currently in the stored state or the extended state.

In a case where the extended state is detected in step S101, the processing of the camera control unit 11 proceeds from step S101 to step S115 in which through-image display control is performed. Note that, in a case where the detection content is at the timing of switching from the previous stored state to the extended state, an instruction is also given to finish the display of the setting list 80 displayed until that time.

In a case where the stored state is detected in step S101, the processing of the camera control unit 11 proceeds to step S102 in which setting display control for stored state is performed on the graphic processing unit 19. That is, the graphic processing unit 19 is instructed to display the setting list 80 as illustrated in FIG. 2, for example. Note that, in a case where the detection content is at the timing of switching from the previous extended state to the stored state, an instruction is also given to finish the display of the through-image displayed until that time.

While the setting list 80 is displayed, the camera control unit 11 monitors, in step S110, whether or not a designation operation for setting change has been performed.

For example, it is assumed that each display content of the setting list 80 in FIG. 2 is respectively an icon for setting change and can be specified by the user via a touch operation or a cursor operation.

For example, in a case where the user intends to change the F value, he/she touches a display region of the F value 84 in the setting list 80 and so on to specify the setting item "F value". Further, in order to change the shutter speed, the user touches the display region of the F value 84 in the setting list 80 and so on to specify the setting item "shutter speed".

In a period in which such a designation operation for setting change is not detected, the camera control unit 11 repeats the check in step S101, and repeats the processing in steps S102 and S110 if the stored state continues. That is, the display of the setting list 80 continues.

In a case where it is detected at a certain point in time that the user operates the zoom operation ring 26 to switch to the extended state, the processing of the camera control unit 11 proceeds from step S101 to step S115 and the display is switched from the setting list 80 to the through-image. Thereafter, if the extended state continues, then the display of the through-image continues.

In a case where it is detected that the user has performed a designation operation on the display of the setting list 80, the processing of the camera control unit 11 proceeds from step S110 to step S111 to perform display control so as to transition to the change screen for the item setting in the menu hierarchy.

The menu of the imaging device 1 has a structure in which, for example, the top screen of the menu presents items of a large classification and selection of an item leads to a change screen for subdivided items in a lower hierarchy. In step S111, within such a menu structure, display control is performed such that the screen directly transitions to the change screen for the designated setting item.

For example, it is assumed that, as the menu hierarchical structure, there are large classification items such as "operation setting", "imaging setting", and "still image setting" . . . in the top screen, and a change screen for shutter speed is provided at one lower level or a plurality of lower levels of "imaging setting". In such a case, when the user performs an operation to designate the display region of the shutter speed 83 in the setting list 80, the screen directly transitions to the change screen for shutter speed in the menu structure. In other words, in the setting list 80, the individual items displayed function as shortcut keys to the respective setting change screens.

In a state where the change screen for a certain setting item is displayed, the camera control unit 11 monitors a setting change operation by the user in step S113 while checking the stored state/extended state in step S112.

If it is detected that the user operates the zoom operation ring 26 to switch to the extended state, the processing of the camera control unit 11 proceeds from step S112 to step S115, and the display of the change screen for items in the menu is finished to switch to the through-image. Thereafter, if the extended state continues, then the display of the through-image continues.

In a case where the camera control unit 11 detects a setting change operation by the user in step S113 with the change screen for a certain setting item displayed, the processing proceeds to step S114 in which processing for reflecting the setting change is performed. In other words, processing for changing the mode or parameter of the setting item operated is performed. Then, the processing proceeds to steps S101 and S102 to return to the display state of the setting list 80.

The processing of FIG. 4 described above allows the user, in the stored state, not only to confirm the setting with the setting list 80, but also to change the setting very easily by specifying an item to be changed, so that it is a suitable user interface in the stored state, i.e., in preparation for imaging.

In addition, since extending the lens finishes the setting list 80 and the change screen to switch to a through-image, which allows for immediate transition to an imaging-ready state even if confirmation or the like is being performed, which is also preferable in terms of not missing a shutter release opportunity.

4. Processing of Third Embodiment

As the third embodiment, power supply control by the camera control unit 11 is described. This is processing of automatically turning off the power supply when a certain period of time has elapsed due to non-operation, and it can be assumed that this processing is performed together with the form of the first and second embodiments described above or the processing of the fourth embodiment described later.

In step S201, the camera control unit 11 checks whether or not it is in a standby state due to non-operation (hereinafter, referred to as "non-operation standby"). The non-operation standby means a state in which no operation is being performed by the user and further a continuous operation such as moving image recording or moving image reproduction is not being performed. Specifically, the non-operation standby period corresponds to a period during which no operation, no recording operation, or no moving image reproduction operation is being performed while, for example, in the stored state, displaying the setting list 80 or the change screen of the second embodiment is continuing, or, in the extended state, displaying the through-image is continuing.

If the non-operation standby is not checked, then the camera control unit 11 turns off a standby flag F1 in step S210.

During the non-operation standby, the processing of the camera control unit 11 proceeds to step S202 to check the standby flag F1; and if the standby flag F1 is not on, a timer TM is reset to "0" in step S203 and turns on the standby flag F1.

If the standby flag F1 is already on when the processing proceeds to step S202 during the non-operation standby, then the camera control unit 11 increments the timer TM in step S205.

Therefore, from a point in time of the non-operation standby, the timer TM starts counting and continues to count up for a period in which the non-operation standby is continuing.

During the non-operation standby, the camera control unit 11 determines the stored state/extended state in step S206 and branches the processing.

If the stored state is detected, then the processing of the camera control unit 11 proceeds to step S207 to determine whether or not the timer TM has reached a threshold th1. If the timer TM has not reached the threshold th1, then the processing returns to step S201; however, if the timer TM has reached the threshold th1, then the processing proceeds to step S209 to perform power-off control.

If the extended state is detected in step S206, then the processing of the camera control unit 11 proceeds to step S208 to determine whether or not the timer TM has reached a threshold th2. If the timer TM has not reached the threshold th1, then the processing returns to step S201; however, if the timer TM has reached the threshold th1, then the processing proceeds to step S209 to perform power-off control.

According to the processing described above, the non-operation standby continues in both the stored state and the extended state, so that the power-off control is automatically performed. However, the thresholds th1 and th2 satisfy th1 <th2. For example, the threshold th1 corresponds to 30 seconds, the threshold th2 corresponds to 1 minute, and so on.

Therefore, in the stored state, the duration of the non-operation standby in which the power is turned off is shorter than that in the extended state.

The processing of the third embodiment described above is performed and, in a state where the setting list 80 and the change screen for setting items are displayed in the stored state and no operation is performed, the display is not continued without reason, and the power is turned off, resulting in reduction of the power consumption.

In addition, considering that the stored state is a standby state for imaging for the user, the automatic power-off may be performed earlier than in the extended state, which improves the power saving effect.

5. Processing of Fourth Embodiment

As the fourth embodiment, the description goes on to an example of processing regarding a cooperative function (extending cooperative recording) of recording a moving image depending on the stored state/the extended state.

The extending cooperative recording is a function to start moving image recording in a case where the camera system is in a mode of recording a moving image and the state is changed from the stored state to the extended state. In addition, a configuration is possible in which the moving image recording is stopped when the extended state is changed to the stored state.

In other words, the user can start or stop the moving image recording only by turning the zoom operation ring 26 as long as the function is enabled.

The camera control unit 11 also performs displaying suitable for the extending cooperative recording.

Figure 6:
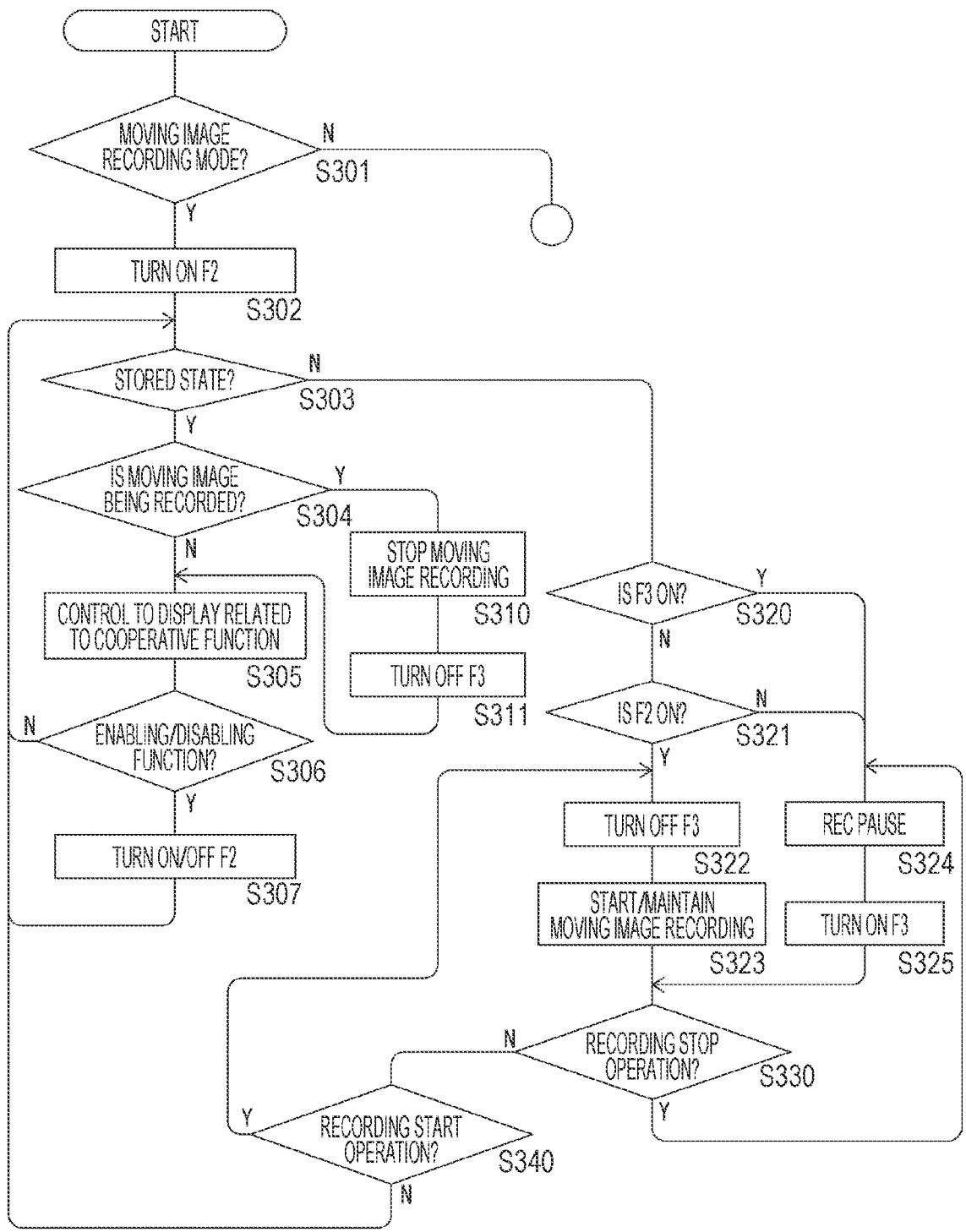
FIG. 6 is a flowchart of processing of a camera control unit according to a fourth embodiment.

FIG. 6 illustrates a processing example of the camera control unit 11.

In step S301, the processing branches depending on whether or not a moving image recording mode is set. The moving image recording mode is a mode that can be selected by the user, for example, with a dial operator (not illustrated) or the like provided in the camera body 10. In the case of the moving image recording mode, the processing in step S302 and onward is executed.

In step S302, the camera control unit 11 turns on a cooperative reservation flag F2. The cooperative reservation flag F2 is a flag that indicates whether the function of the extending cooperative recording is enabled or disabled. In step S302, as an example, the cooperative reservation flag F2 is turned on, assuming that the extending cooperative recording is enabled by default in the moving image recording mode.

Needless to say, a processing example in which the cooperative reservation flag F2 is turned off in such a case, that is, a processing example in which the extending cooperative recording is disabled by default is also possible.

In step S303, the camera control unit 11 determines the stored state/the extended state.

If the stored state is detected, then the processing of the camera control unit 11 proceeds to step S304 to branch the processing depending on whether or not the moving image recording is being performed. Then, if the moving image recording is not being performed, then the processing of the camera control unit 11 proceeds to step S305 to instruct the graphic processing unit 19 to execute display related to the cooperative function. For example, the camera control unit 11 displays a cooperative function state presentation image 70 as illustrated in FIG. 7A or 7B.

Figure 7A:
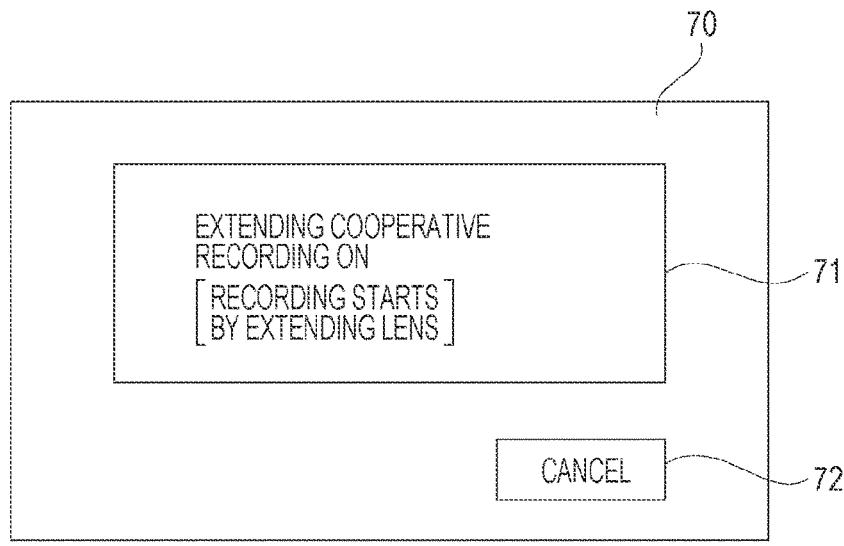
FIGS. 7A and 7B are explanatory diagrams of a display example regarding a cooperative function according to the fourth embodiment.

The cooperative function state presentation image 70 in FIG. 7A includes an enabled message 71 and a cancel button 72.

Figure 7B:
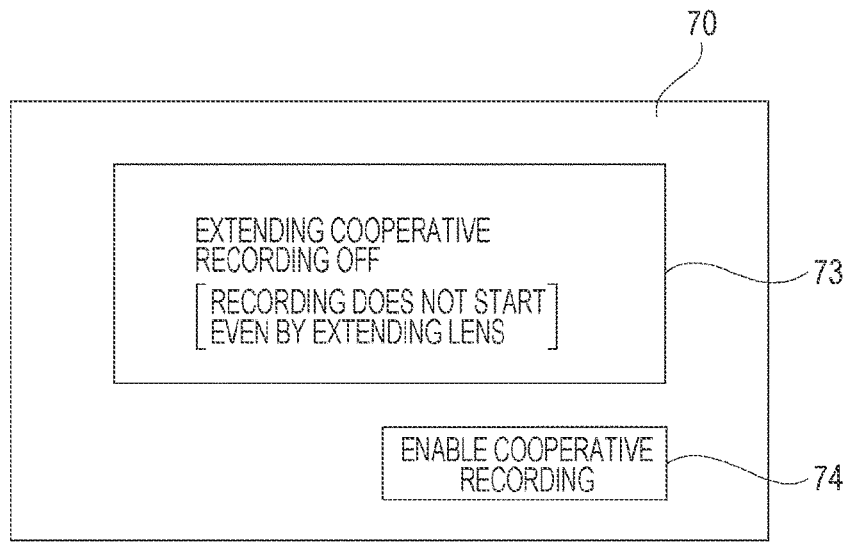

The cooperative function state presentation image 70 in FIG. 7B includes a disabled message 73 and a cooperate button 74.

For example, in a case where the cooperative reservation flag F2 is turned on in step S302 and the processing proceeds to step S305, the camera control unit 11 instructs the graphic processing unit 19 to display the indication of FIG. 7A, and notifies the user that the extending cooperative recording is enabled. In addition, the extending cooperative recording can be disabled in response to the user operating the cancel button 72.

In a case where it is detected that the user has operated the cancel button 72, the processing of the camera control unit 11 proceeds from step S306 to step S307 to turn off the cooperative reservation flag F2. Then, the processing proceeds to steps S303, S304, and S305.

In such a case, the camera control unit 11 instructs the graphic processing unit 19 to display the indication of FIG. 7B, and notifies the user that the extending cooperative recording is disabled. In addition, the extending cooperative recording can be enabled in response to the user operating the cooperate button 74.

In a case where it is detected that the user has operated the cooperate button 74, the processing of the camera control unit 11 proceeds from step S306 to step S307 to turn on the cooperative reservation flag F2. Then, the processing proceeds to steps S303, S304, and S305. In such a case, the display of the indication of FIG. 7A is executed again.

As described above, in the stored state, the camera control unit 11 causes the display unit 13 to display the cooperative function state presentation image 70, presents the extending cooperative recording enabled/disabled to the user, and enables the operation for enabling/disabling.

In response to the extended state detected in step S303, the camera control unit 11 checks a pause flag F3 in step S320. The pause flag F3 is a flag indicating a recording pause (REC pause) state.

At the first timing at which the user performs extending operation from the stored state, the pause flag F3 is off, and the processing of the camera control unit 11 proceeds to step S321 to check the cooperative reservation flag F2.

If the cooperative reservation flag F2 is on, then the camera control unit 11 sets the pause flag F3 to off (or continues to be off) in step S322, and performs control to start moving image recording in step S323.

In other words, when the user operates the zoom operation ring 26 to extend the collapsible barrel 21 with the extending cooperative recording enabled, moving image recording is automatically started.

After the moving image recording is started, the camera control unit 11 performs loop processing of steps S330, S340, S303, S320, S321, S322, and S323, and during the processing, the moving image recording continues in step S323.

When the user operates the zoom operation ring 26 to store the collapsible barrel 21 while the moving image recording is performed, the moving image recording is stopped.

To be specific, when the stored state is detected in step S303 during the moving image recording, the processing of the camera control unit 11 proceeds from step S304 to step S310 in which the moving image recording is stopped. Further, in step S311, the pause flag F3 is set to off. Then, the processing of the camera control unit 11 proceeds to step S305, and performs display control of the cooperative function state presentation image 70 as described above.

Therefore, the user can start or stop recording only by operating the zoom operation ring 26.

Note that, even if the zoom operation ring 26 is operated to perform extending, the moving image recording is not started in a case where the function of the extending cooperative recording is disabled, that is, a case where the cooperative reservation flag F2 is off. In such a case, the processing of the camera control unit 11 proceeds to steps S303, S320, and S324 in response to the extending operation by the user, and in step S324, the recording is temporarily stopped (REC pause). That is, it is set to a standby state until the start operation of the moving image recording. Then, in step S325, the pause flag F3 is set to on.

When the moving image recording is performed, the camera control unit 11 monitors, in step S330, a stop operation by the user, in particular, a stop operation other than the zoom operation ring 26 in this case. For example, as an operation of the recording operator 18, an operation of stopping recording by the user is monitored.

In a case where the stop operation is detected, the processing of the camera control unit 11 proceeds to step S324 in which the moving image recording is stopped to enter a recording pause (REC pause) state. That is, it is set to a standby state until the start operation of the moving image recording. Then, in step S325, the pause flag F3 is set to on.

After that, the processing proceeds to steps S330, S340, S303, and S320, and the processing proceeds to step S324 because the pause flag F3 is on. In such a case, the recording pause state continues in step S324, and the on state of the pause flag F3 is maintained in step S325.

While recording is paused, the user can start the moving image recording by operating the recording operator 18. In response to the operation of the recording operator 18 in this case detected, the camera control unit 11 recognizes the operation as a recording start operation in step S340, the processing proceeds to step S322 to turn off the pause flag F3, and performs control to start the moving image recording in step S323.

As described above, the user can start and stop the moving image recording by operating the zoom operation ring 26, and can also start and stop the moving image recording also with the recording operator 18, which improves the usability.

6. Summary and Modification Example

In the embodiments described above, the following effects can be obtained.

The imaging device 1 according to an embodiment includes the camera body 10 configured to attach, to the barrel body 20, the lens barrel 2 including the collapsible barrel 21 in which a barrel holding at least one lens can be in a stored state and in an extended state by manual operation. Further, the imaging device 1 includes the camera control unit 11 configured to perform control to execute a display of information indicating a state of the imaging device 1 in a case where the lens barrel 2 attached to the camera body 10 is detected to be in the stored state.

When the lens barrel 2 is in the stored state, appropriate imaging cannot be performed; however, it can be considered as a standby state for imaging. Therefore, the display unit 13 displays information indicating the state of the imaging device 1 to make the user recognize the state, which is appropriate information display for preparation before imaging. The user checks the current state of the imaging device 1 to make an appropriate preparation (mode change of the imaging device 1, adjustment of brightness of the object, selection of imaging environment, and the like) as necessary, which is also desirable in terms of avoiding subsequent failures in imaging.

Further, for example, the setting list 80, the cooperative function state presentation image 70, and the like are displayed, in the stored state, as the information indicating the state of imaging device 1, which makes it easy for the user to recognize that the lens barrel 2 is in the stored state by displaying the setting list 80 and the like. That is, this motivates the user to perform operation of extending the lens barrel.

Note that, in the first, second, and fourth embodiments, the setting list 80, the cooperative function state presentation image 70, and the like are displayed in the stored state; however, it is also possible to select not to display them in accordance with user's preference.

Further, the information indicating the state of the imaging device 1 is displayed on the display unit 13 of the camera body 10; however, the information may be displayed on a display device provided separately from the camera body 10.

Further, the display unit 13 may be configured as not only a display unit such as a liquid crystal panel provided on the camera body 10 but also a viewfinder.

In the first and second embodiments, the example is described in which the camera control unit 11 performs control to display setting information as the information indicating a state of the imaging device 1.

As the setting information, for example, the setting list 80 is displayed in the stored state, so that the user can check the current settings of the imaging device 1 at the timing before imaging, for example, camera settings that are important to the user at the time of imaging, such as an aperture priority mode, an exposure correction mode, a shutter speed, an F value, and an ISO sensitivity. Therefore, useful information is displayed at the timing immediately before the actual imaging.

Note that, although the setting list 80 is taken as a display example of the setting information, it is not always necessary to display a list of a plurality of settings. Another configuration is possible in which at least one setting state is displayed. In particular, it is preferable to display one or more settings (mode, parameter, and the like) that the user desirably checks in the preparation stage of imaging.

In addition, even in a case where a plurality of pieces of setting information is displayed in a list as in the setting list 80, or, alternatively, in a case where only one piece of setting information is displayed, the user may be allowed to select, in advance, the setting information to be displayed. This is because it is useful for the user, who often changes a specific setting, to confirm the setting.

In the first and second embodiments, the camera control unit 11 performs control to finish the display of the setting information in response to that the extended state is detected while the setting information is displayed in response to the detection of the stored state.

The display of the setting list 80 indicating the setting information is finished, and for example, a through-image can be appropriately visually recognized, which allows the user to recognize that extending the lens leads to an appropriate state in which imaging can be performed. This makes it easy for the user to recognize a state in which imaging can be performed, which is user-friendly.

In addition, when the display of the setting list 80 disappears, the through-image of the object is displayed on the screen of the display unit 13 in an easy-to-see manner, and a display state suitable for imaging is provided.

In the first and second embodiments, the example is described in which the camera control unit 11 performs control to display the setting information and not to display a through-image of a captured image in response to the detection of the stored state, and performs control to finish the display of the setting information and to display the through-image of the captured image in response to detection of the extended state.

The display of the setting list 80 indicating the setting information is finished and a through-image is displayed, which is suitable for allowing the user to recognize that extending the lens leads to a state in which appropriate imaging can be performed.

In particular, in the stored state, the setting list 80 and the like of FIG. 2 is displayed and no through-image is displayed, which also means that a blurred through-image in the stored state is not displayed, which prevents the display quality of the imaging device 1 from being lowered. Then, the fact that a through-image appears in the extended state makes the user naturally be aware of the imaging state.

Note that a through-image may be displayed even in the stored state. For example, the display as illustrated in FIG. 2 may be performed so as to be superimposed on a through-image in substantially the entire screen such that, in the stored state, the setting list 80 is mainly displayed and the quality of the through-image does not matter.

In the second embodiment, the example is described in which the camera control unit 11 performs setting change processing in response to detection of a predetermined operation in a case where the setting information is displayed.

For example, when the user selects a setting item in the setting list 80 via a touch operation, a cursor operation, or the like, the screen transitions to an operation screen of the selected setting item (step S111 in FIG. 4). When the setting change operation is performed, the setting change processing is performed (Steps S113 and S114). As a result, in the stored state, it is possible to easily perform a change operation for an arbitrary setting while the setting is checked in the setting list 80.

In the second embodiment, the example is described in which the camera control unit 11 displays, in response to detection of a designation operation on the display of the setting information, a change screen in a menu hierarchy of setting information designated, and performs setting change processing in response to detection of an operation on the change screen.

For example, an operation is usually performed to follow the hierarchy of items in the menu screen to reach a change screen for an arbitrary setting item, while the change screen is directly reached from the setting list 80. For example, selecting the display part of the shutter speed 83 transitions the screen to a change screen for shutter speed. As a result, the setting list 80 has a role as a shortcut icon that can be used in the stored state, which makes it extremely easy to change the setting of an arbitrary item while the setting is checked in the stage of imaging preparation, resulting in the great improvement in usability.

In the second embodiment, the example is described in which the camera control unit 11 performs control to finish the display of the change screen and to display the through-image of the captured image in response to detection of the extended state while the change screen is displayed in the stored state.

Even when transition is made from the setting list 80 to the change screen in the menu item for display, the change screen display in response to the user extending the lens is finished, and the state is returned to a state in which the object can be confirmed in the through-image. As a result, even in a state of entering the menu hierarchy, it is possible to immediately transition to the imaging-ready state by extending the lens barrel. It is also effective in terms of not missing a shutter opportunity in the preparation state in which the settings and so on are changed in the stored state.

Further, the display of the change screen is finished and a through-image is displayed, which also means allowing the user to recognize that extending the lens leads to a state in which appropriate imaging can be performed.

Further, for the user, even if entering the menu once, the user can easily exit the menu by extending the lens barrel, which improves the operability also.

In the fourth embodiment, the example is described in which the camera control unit 11 performs control to display,
as the information indicating a state of the imaging device 1, information regarding a cooperative function in which moving image recording is controlled in response to the stored state and the extended state of the lens barrel.

For example, in a case where a cooperative function (extending cooperative recording) in which moving image recording starts in response to the collapsible barrel 21 extended, the cooperative function state presentation image 70 is displayed as a display related to the function.

It can be said that appropriate moving image recording cannot be performed in the stored state, and as for the moving image recording also, the stored state can be said to be a preparation period. Here, considering performing the extending cooperative recording in the moving image recording mode, the user can appropriately recognize whether or not the extending cooperative recording is activated in response to the operation of the zoom operation ring 26 by displaying information regarding whether or not the extending cooperative recording is reserved in the stored state. Therefore, it is possible to cause the user to appropriately recognize the operation method regarding the moving image recording. It is also possible to present a suitable extending cooperative recording to a user who does not want to miss a shutter opportunity.

In the fourth embodiment, the example is described in which the camera control unit 11 performs control to start the moving image recording in response to the extended state of the lens barrel 2 in a case where the cooperative function is enabled.

Since the moving image recording starts only by extending the lens by enabling the function of the extending cooperative recording (turning on the cooperative reservation flag F2), the function is very useful in a sense that a recording opportunity is not missed.

In the case of the collapsible lens barrel, two actions of extending the lens and then performing the recording start operation with a recording button or the like are required; however, since recording starts only by operating the zoom operation ring 26 by the extending cooperative recording, it is easy for a camera operator to immediately respond to the recording start opportunity.

In the fourth embodiment, the example is described in which the camera control unit 11 performs control to stop the moving image recording in response to the stored state of the lens barrel 2 in a case where the moving image recording is started with the cooperative function.

By adopting the operation mode in which the moving image recording is stopped by storing the lens, for a user who starts the moving image recording by extending the lens, the function of the extending cooperative recording makes it possible to provide an operation that is very easy to understand.

Further, since recording with an appropriate image quality cannot be performed due to the stored state, stopping the moving image recording in response to the stored state is desirable processing from the viewpoint of maintaining the quality of the moving image to be recorded.

Note that the camera control unit 11 may activate only the moving image recording stop as the cooperative function. For example, it is assumed that the moving image recording is started merely in response to the operation on the recording operator 18. However, in a case where the user puts the collapsible barrel 21 into the stored state during recording, the recording stop control is performed. In this way, a moving image with a low image quality due to the stored state can be prevented from being recorded.

In the fourth embodiment, the example is described in which the camera control unit 11 performs control to execute a display in which an operation of on/off of the cooperative function is enabled together with the information regarding the cooperative function, for example, a display of the cancel button 72 in FIG. 7A or the cooperate button 74 in FIG. 7B. This allows the user to select on/off of the cooperative function such that moving image recording starts in response to the collapsible lens extended.

By providing a user interface that not only presents the reserved state of the extending cooperative recording in the stored state but also operates on/off of the reserved state, the user can appropriately select the function of the extending cooperative recording in the stored state, that is, while the user is waiting for imaging, which improves the usability of the function of the extending cooperative recording.

In the third embodiment, the example is described in which the camera control unit 11 performs control to finish the display of the information indicating a state of the imaging device 1 and to turn off a power in response to that the stored state continues for a first predetermined period of time (time corresponding to the threshold th1) or more in standby due to non-operation.

As described above, it is useful to display the information (setting information and information regarding the cooperative function, for example) indicating the state of the imaging device 1 in the stored state; however, keeping the display for a long time is wasteful in terms of power consumption. In view of this, the display is finished at a time when the first predetermined period of time has elapsed, and the power is turned off.

In the third embodiment, the camera control unit 11 performs control to turn off the power in response to that the standby due to non-operation continues for a second predetermined period of time (time corresponding to the threshold th2) or more in the extended state, and the first predetermined period of time is shorter than the second predetermined period of time. In other words, in both the extended state and the stored state, the power is turned off after the lapse of time in non-operation; however, the power is turned off earlier in the stored state.

Since the stored state is a standby state for the user, it is conceivable that the stored state is a state not in use, and it is not desirable to continue the display for a long time. In view of this, the time at which the thresholds th1 and th2 in FIG. 6 are set to th1<th2, and the power is turned off earlier in the case of non-operation continuation in the stored state. With this arrangement, the power consumption in the stored state is reduced.

Note that the effects described in the present specification are only examples and are not limitative ones, and further there may be other effects.

Note that the present technology may also be configured as below.

(1)

An imaging device including:
a camera body configured to attach, to a barrel body, a lens barrel including a collapsible barrel in which a barrel holding at least one lens can be in a stored state and in an extended state by manual operation; and
a control unit configured to perform control to execute a display of information indicating a state of the imaging device in a case where the lens barrel attached to the camera body is detected to be in the stored state.

(2)

The imaging device according to (1) described above, in which
the control unit
performs control to display setting information as the information indicating a state of the imaging device.

(3)

The imaging device according to (2) described above, in which
the control unit
performs control to finish the display of the setting information in response to that the extended state is detected while the setting information is displayed in response to the detection of the stored state.

(4)

The imaging device according to (2) or (3) described above, in which
the control unit
performs control to display the setting information and not to display a through-image of a captured image in response to the detection of the stored state, and
performs control to finish the display of the setting information and to display the through-image of the captured image in response to detection of the extended state.

(5)

The imaging device according to any of (2) to (4) described above, in which
the control unit
performs setting change processing in response to detection of a predetermined operation in a case where the setting information is displayed.

(6)

The imaging device according to any of (2) to (5) described above, in which
the control unit
displays, in response to detection of a designation operation on the display of the setting information, a change screen in a menu hierarchy of setting information designated, and performs setting change processing in response to detection of an operation on the change screen.

(7)

The imaging device according to (6) described above, in which
the control unit
performs control to finish the display of the change screen and to display the through-image of the captured image in response to detection of the extended state while the change screen is displayed in the stored state.

(8)

The imaging device according to (1) described above, in which
the control unit
performs control to display, as the information indicating a state of the imaging device, information regarding a cooperative function in which moving image recording is controlled in response to the stored state and the extended state of the lens barrel.

(9)

The imaging device according to (8) described above, in which
the control unit
performs control to start the moving image recording in response to the extended state of the lens barrel in a case where the cooperative function is enabled.

(10)

The imaging device according to (9) described above, in which
the control unit
performs control to stop the moving image recording in response to the stored state of the lens barrel in a case where the moving image recording is started with the cooperative function.

(11)

The imaging device according to any of (8) to (10) described above, in which
the control unit
performs control to execute a display in which an operation of on/off of the cooperative function is enabled together with the information regarding the cooperative function.

(12)

The imaging device according to any of (1) to (11) described above, in which
the control unit
performs control to finish the display of the information indicating a state of the imaging device and to turn off a power in response to that the stored state continues for a first predetermined period of time or more in standby due to non-operation.

(13)

The imaging device according to (12) described above, in which
the control unit
performs control to turn off the power in response to that the standby due to non-operation continues for a second predetermined period of time or more in the extended state, and
the first predetermined period of time is shorter than the second predetermined period of time.

(14)

An imaging method including:
performing, by an imaging device including a camera body configured to attach, to a barrel body, a lens barrel including a collapsible barrel in which a barrel holding at least one lens can be in a stored state and in an extended state by manual operation,
control to execute a display of information indicating a state of the imaging device in a case where the lens barrel attached to the camera body is detected to be in the stored state.

REFERENCE SIGNS LIST

1 Imaging device
2 Lens barrel
10 Camera body
11 Camera control unit
12 Image signal processing unit
13 Display unit
14 Image sensor
15 Recording unit
16 Lens power supply unit
17 Power supply operator
18 Recording operator
19 Graphic processing unit
20 Barrel body
21 Collapsible barrel
22 Lens control unit
26 Zoom operation ring
27 Zoom/collapsed position sensor
70 Cooperative function state presentation image
80 Setting list

The invention claimed is:

1. An imaging device, comprising:
an image sensor configured to capture an image;
a barrel body;
a camera body attached to the barrel body;
a lens barrel that includes:
a collapsible barrel that includes a barrel; and
a first central processing unit (CPU) configured to detect a specific state of the imaging device, wherein
the specific state of the imaging device corresponds to one of a stored state of the barrel or an extended state of the barrel,
the barrel is configured to hold at least one lens,
the barrel is in one of the stored state or the extended state based on a first operation of a user,
in the stored state of the barrel, the imaging device is in a standby state for at least a first period of time,
in the extended state of the barrel, the imaging device is in the standby state for at least a second period of time different from the first period of time, and
the first period of time is shorter than the second period of time;
a display device configured to display setting information, wherein
the setting information indicates the stored state of the barrel; and
a second CPU configured to control the display of the setting information based on the stored state of the barrel.

2. The imaging device according to claim 1, wherein
the second CPU is further configured to stop the display of the setting information based on the extended state of the barrel.

3. The imaging device according to claim 1, wherein
the second CPU is further configured to control the display of the setting information based on the detection of the specific state of the imaging device, and
the display device is further configured to:
stop the display of the setting information; and
display a through-image of the captured image based on the extended state of the barrel.

4. The imaging device according to claim 1, wherein
the second CPU is further configured to perform a setting change processing based on second operation of the user, and
the second operation of the user is associated with the display of the setting information.

5. The imaging device according to claim 1, wherein the second CPU is further configured to:
control display of the display device;
detect a designation operation on the display of the setting information;
perform a change screen based on the detection of the designation operation on the display of the setting information, wherein the change screen is associated with a menu hierarchy of the setting information; and
perform a setting change processing based on the detection of the designation operation on the change screen.

6. The imaging device according to claim 5, wherein the second CPU is further configured to:
stop display of the change screen; and
display a through-image of the captured image based on the extended state of the barrel, and
the display of the change screen in the stored state of the barrel.

7. An imaging device, comprising:
a barrel body;
a camera body attached to the barrel body;
a lens barrel that includes:
- a collapsible barrel that includes a barrel; and
- a first central processing unit (CPU) configured to detect a specific state of the imaging device, wherein
    the specific state of the imaging device corresponds to one of a stored state of the barrel or an extended state of the barrel,
    the barrel is configured to hold at least one lens,
    the barrel is in one of the stored state or the extended state based on a first operation of a user,
    in the stored state of the barrel, the imagine device is in a standby state for at least a first period of time,
    in the extended state of the barrel, the imaging device is in the standby state for at least a second period of time different from the first period of time, and
    the first period of time is shorter than the second period of time; and
a second CPU configured to control a display, wherein
    the display is associated with setting information and specific information,
    the setting information indicates the specific state of the imaging device based on the stored state of the barrel
    the specific information indicates a cooperative function,
    the cooperative function is associated with a moving image recording process, and
    the moving image recording process is based on the extended state of the barrel.

8. The imaging device according to claim 7, wherein the second CPU is further configured to start the moving image recording process based on
the extended state of the barrel, and
the cooperative function being enabled.

9. The imaging device according to claim 8, wherein the second CPU is further configured to stop the moving image recording process based on
the stored state of the barrel, and
the moving image recording process is started with the cooperative function.

10. The imaging device according to claim 7, wherein
the second CPU is further configured to control a display of an icon,
the icon is associated with an on operation and an off operation,
each of the on operation and the off operation is associated with the cooperative function, and
one of the on operation or the off operation is enabled with the specific information based on a second operation of the user.

11. The imaging device according to claim 1, wherein the second CPU is further configured to:
stop the display of the setting information; and
turn off power based on the stored state of the barrel.

12. The imaging device according to claim 11, wherein
in the extended state of the barrel, the second CPU is further configured to turn off the power based on the imaging device is in the standby state.

13. An imaging method, comprising:
detecting, by a first central processing unit (CPU), a specific state of an imaging device, wherein
    the imaging device comprises:
        a second CPU;
        a barrel body;
        a camera body attached to the barrel body; and
        a lens barrel including:
            a collapsible barrel that includes a barrel; and
            the first CPU,
    the specific state of the imaging device corresponds to one of a stored state of the barrel or an extended state of the barrel,
    the barrel is in one of the stored state or the extended state based on an operation of a user,
    in the stored state of the barrel, the imagine device is in a standby state for at least a first period of time,
    in the extended state of the barrel, the imaging device is in the standby state for at least a second period of time different from the first period of time, and
    the first period of time is shorter than the second period of time; and
controlling, by the second CPU, a display of setting information, wherein
    the setting information indicates the specific state of the imaging device based on the stored state of the barrel.

* * * * *